US007589296B2

(12) United States Patent
Fujioka et al.

(10) Patent No.: US 7,589,296 B2
(45) Date of Patent: Sep. 15, 2009

(54) PLASMA GENERATING ELECTRODE AND PLASMA REACTOR

(75) Inventors: Yasumasa Fujioka, Nagoya (JP); Masaaki Masuda, Nagoya (JP); Atsuo Kondo, Okazaki (JP)

(73) Assignees: NGK Insulators, Ltd., Nagoya (JP); Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 10/568,980

(22) PCT Filed: Sep. 10, 2004

(86) PCT No.: PCT/JP2004/013211

§ 371 (c)(1), (2), (4) Date: Feb. 21, 2006

(87) PCT Pub. No.: WO2005/027593

PCT Pub. Date: Mar. 24, 2005

(65) Prior Publication Data

US 2007/0045246 A1 Mar. 1, 2007

(30) Foreign Application Priority Data

Sep. 12, 2003 (JP) ............................. 2003-322065

(51) Int. Cl.
*B23K 10/00* (2006.01)
*B01J 19/08* (2006.01)

(52) U.S. Cl. ............................ 219/121.52; 219/121.36; 219/543; 422/186.04

(58) Field of Classification Search ............ 219/121.36, 219/121.41, 121.48, 121.52, 121.59, 543; 422/186.04, 906, 907
See application file for complete search history.

(56) References Cited

U.S. PATENT DOCUMENTS

| | | | | |
|---|---|---|---|---|
| 4,652,318 | A | 3/1987 | Masuda et al. | |
| 4,922,099 | A | 5/1990 | Masuda et al. | |
| 6,149,760 | A | 11/2000 | Hama | |
| 6,423,190 | B2 * | 7/2002 | Hemingway et al. | 204/164 |
| 2002/0027133 | A1 * | 3/2002 | Kellogg et al. | 219/543 |

(Continued)

FOREIGN PATENT DOCUMENTS

| | | |
|---|---|---|
| JP | A-59-044797 | 3/1984 |

(Continued)

*Primary Examiner*—Tu B Hoang
*Assistant Examiner*—Stephen J Ralis
(74) *Attorney, Agent, or Firm*—Oliff & Berridge, PLC

(57) ABSTRACT

A plasma generating electrode according to the invention includes at least two opposing plate-shaped unit electrodes 2, each having a rectangular surface and four end faces, and a holding member 5 which holds at least one (fixed end 6) of a pair of parallel ends (pair of ends) of four ends of the unit electrode 2 corresponding to the four end faces, at least one of the opposing unit electrodes 2 being a conductive-film-containing electrode 8 including a ceramic body 3 and a conductive film 4, and a distance "a" (mm) from an edge of the conductive film 4 to an edge of the ceramic body 3 on the other pair of parallel ends (other pair of ends 9) of the four ends of the conductive-film-containing electrode 8 adjacent to the pair of ends and a thickness "c" (mm) of the ceramic body 3 satisfying a relationship "(c/2)≦a≦5c". The plasma generating electrode 1 is effectively prevented from breaking due to thermal shock.

10 Claims, 5 Drawing Sheets

U.S. PATENT DOCUMENTS

| | | | | |
|---|---|---|---|---|
| 2002/0131918 | A1 * | 9/2002 | Nelson et al. | 422/186.04 |
| 2002/0174938 | A1 | 11/2002 | Xiaobin Li et al. | |
| 2005/0229564 | A1 * | 10/2005 | Okubo et al. | 55/523 |
| 2006/0152133 | A1 * | 7/2006 | Miyairi | 313/495 |

FOREIGN PATENT DOCUMENTS

| | | |
|---|---|---|
| JP | A-08-049525 | 2/1996 |
| JP | A-10-066828 | 3/1998 |
| JP | A-11-251303 | 9/1999 |
| JP | A-2001-164925 | 6/2001 |
| JP | A-2002-273170 | 9/2002 |
| JP | A-2003-275618 | 9/2003 |
| JP | A-2004-160363 | 6/2004 |
| WO | WO 2005005798 A1 * | 1/2005 |

* cited by examiner

PLASMA GENERATING ELECTRODE AND PLASMA REACTOR

TECHNICAL FIELD

The invention relates to a plasma generating electrode and a plasma reactor. More particularly, the invention relates to a plasma generating electrode which is effectively prevented from breaking due to thermal shock and, when disposing the plasma generating electrode in an exhaust gas passage and treating exhaust gas using plasma generated by the plasma generating electrode, capable of stably generating uniform plasma due to a reduction in the amount of substance deposited on the surface of a unit electrode forming the plasma generating electrode, and a plasma reactor including the plasma generating electrode.

BACKGROUND ART

A silent discharge occurs when disposing a dielectric between two electrodes secured on each end and applying a high alternating current voltage or a periodic pulsed voltage between the electrodes. In the resulting plasma field, active species, radicals, and ions are produced to promote a gaseous reaction and decomposition. This phenomenon may be utilized to remove toxic components in exhaust gas discharged from an engine, an incinerator, or the like.

A plasma reactor or the like has been disclosed which treats $NO_x$, carbon particulate, HC, CO, or the like in exhaust gas discharged from an engine, an incinerator, or the like by causing the exhaust gas to pass through a plasma field (see patent document 1).

Patent document 1: JP-A-2001-164925

DISCLOSURE OF THE INVENTION

However, it is difficult for the above-described plasma reactor to stably generate uniform plasma. Moreover, when treating exhaust gas discharged from an engine or the like, soot contained in exhaust gas is deposited on the surface of a plasma generating electrode forming the plasma reactor to clog the exhaust gas passage, whereby the pressure loss is increased. In addition, the plasma generating electrode easily breaks due to thermal shock.

The invention was achieved in view of the above-described problems and provides a plasma generating electrode which is effectively prevented from breaking due to thermal shock and, when disposing the plasma generating electrode in an exhaust gas passage and treating exhaust gas using plasma generated by the plasma generating electrode, capable of stably generating uniform plasma due to a reduction in the amount of substance deposited on the surface of a unit electrode forming the plasma generating electrode, and a plasma reactor including the plasma generating electrode.

The invention provides the following plasma generating electrode and plasma reactor.

[1] A plasma generating electrode comprising at least two opposing plate-shaped unit electrodes, each having a rectangular surface and four end faces, and a holding member which holds at least one (fixed end) of a pair of parallel ends (pair of ends) of four ends of the unit electrode corresponding to the four end faces in a state in which the unit electrodes are separated at a specific interval, and is capable of generating plasma upon application of voltage between the unit electrodes, at least one of the opposing unit electrodes being a conductive-film-containing electrode including a ceramic body as a dielectric and a conductive film disposed inside the ceramic body, and a distance "a" (mm) from an edge of the conductive film to an edge of the ceramic body on the other pair of parallel ends (other pair of ends) of the four ends of the conductive-film-containing electrode adjacent to the pair of ends and a thickness "c" (mm) of the ceramic body satisfying a relationship "$(c/2) \leqq a \leqq 5c$".

[2] The plasma generating electrode according to [1], wherein a distance "b" (mm) from the edge of the conductive film to the edge of the ceramic body on the fixed end of the conductive-film-containing electrode and the thickness "c" (mm) of the ceramic body satisfy a relationship "$2c \leqq b \leqq 10c$".

[3] The plasma generating electrode according to [1] or [2], wherein, when the pair of ends of the conductive-film-containing electrode has an end (free end) other than the fixed end, a distance "d" (mm) from the edge of the conductive film to the edge of the ceramic body on the free end and the thickness "c" (mm) of the ceramic body satisfy a relationship "$(c/2) \leqq d \leqq 5c$".

[4] The plasma generating electrode according to any of [1] to [3], wherein the conductive film has a thickness of 5 to 30 μm.

[5] The plasma generating electrode according to any of [1] to [4], wherein the ceramic body includes at least one ceramic selected from the group consisting of alumina, mullite, ceramic glass, zirconia, cordierite, silicon nitride, aluminum nitride, and glass.

[6] The plasma generating electrode according to any of [1] to [5], wherein the conductive film includes at least one metal selected from the group consisting of tungsten, molybdenum, manganese, chromium, titanium, zirconium, nickel, iron, silver, copper, platinum, and palladium.

[7] A plasma reactor comprising the plasma generating electrode according to any of [1] to [6], and a casing having a passage (gas passage) for a gas containing a specific component formed therein, wherein, when the gas is introduced into the gas passage of the casing, the specific component contained in the gas can be reacted by plasma generated by the plasma generating electrode.

[8] The plasma reactor according to [7], comprising a pulsed power supply for applying voltage to the plasma generating electrode

[9] The plasma reactor according to [8], wherein the pulsed power supply includes at least one SI thyristor.

The plasma generating electrode according to the invention is effectively prevented from breaking due to thermal shock and, when disposing the plasma generating electrode in an exhaust gas passage and treating exhaust gas using plasma generated by the plasma generating electrode, capable of stably generating uniform plasma due to a reduction in the amount of substance deposited on the surface of a unit electrode forming the plasma generating electrode. Since the plasma reactor according to the invention includes the above-described plasma generating electrode, a substance is rarely deposited on the surface of the unit electrode, whereby the gas can be efficiently reacted.

BRIEF DESCRIPTION OF THE DRAWINGS

FIG. 5(*b*) is a cross-sectional view along the line A-A shown in FIG. 5(*a*).

EXPLANATION OF SYMBOLS

1: plasma generating electrode, 2: unit electrode, 3: ceramic body, 4: conductive film, 5: holding member, 6: fixed end, 7: free end, 8: conductive-film-containing electrode, 9: other pair of ends, 11: plasma reactor, 12: casing, 13: gas passage, 14: other unit electrode, 15: pair of ends

BEST MODE FOR CARRYING OUT THE INVENTION

Embodiments of the plasma generating electrode and the plasma reactor according to the invention are described below in detail with reference to the drawings. Note that the invention should not be construed as being limited to the following embodiments. Various alterations, modifications, and improvements may be made within the scope of the invention based on knowledge of a person skilled in the art.

Figure 1:
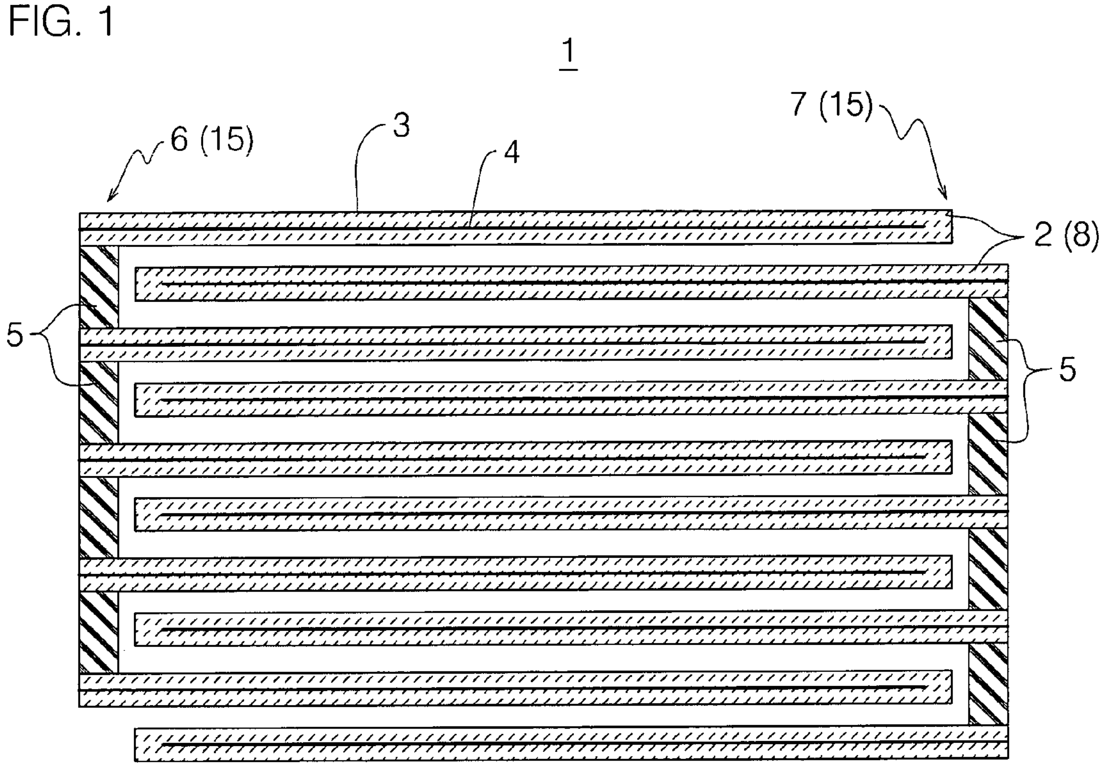
FIG. 1 is a cross-sectional view along a plane perpendicular to the surface of a unit electrode in one embodiment of a plasma generating electrode according to the invention.
Figure 2:
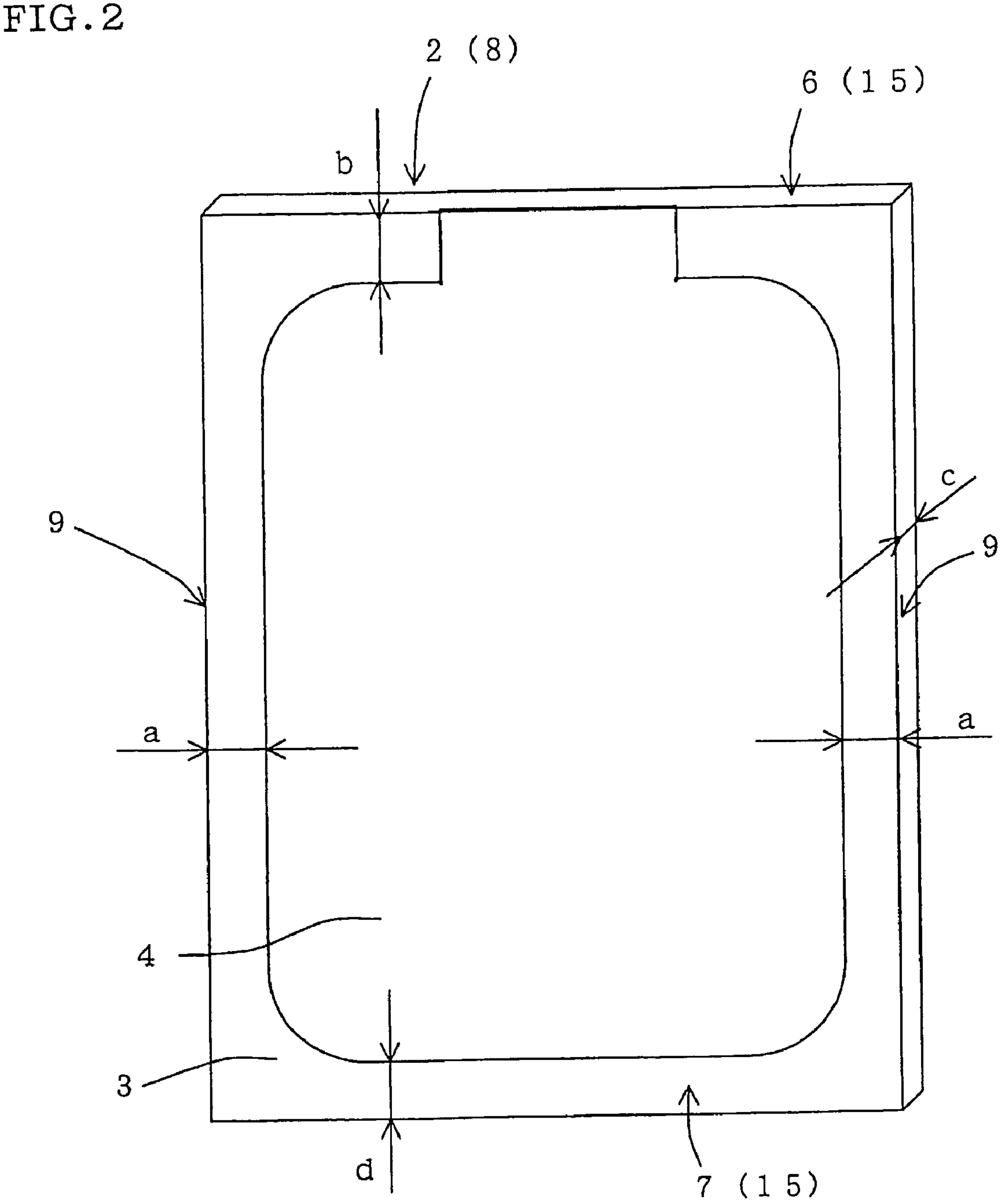
FIG. 2 is an oblique view showing the unit electrode forming one embodiment of the plasma generating electrode according to the invention.

FIG. 1 is a cross-sectional view along a plane perpendicular to the surface of a unit electrode in one embodiment of the plasma generating electrode according to the invention, and FIG. 2 is an oblique view showing the unit electrode forming the plasma generating electrode according to one embodiment of the invention.

As shown in FIGS. 1 and 2, a plasma generating electrode 1 according to one embodiment of the invention includes at least two opposing plate-shaped unit electrodes 2, each having a rectangular surface and four end faces, and a holding member 5 which holds at least one (fixed end 6) of a pair of parallel ends (pair of ends 15) of four ends of the unit electrode 2 corresponding to the four end faces in a state in which the unit electrodes 2 are separated at a specific interval, and is capable of generating plasma upon application of voltage between the unit electrodes 2, at least one of the opposing unit electrodes 2 being a conductive-film-containing electrode 8 including a ceramic body 3 as a dielectric and a conductive film 4 disposed inside the ceramic body 3, and a distance “a” (mm) from an edge of the conductive film 4 to an edge of the ceramic body 3 on the other pair of parallel ends (other pair of ends 9) of the four ends of the conductive-film-containing electrode 8 adjacent to the pair of ends 15 and a thickness “c” (mm) of the ceramic body 3 satisfying a relationship “$(c/2)\leqq a\leqq 5c$”. This configuration effectively prevents breakage due to thermal shock. Moreover, when disposing the plasma generating electrode 1 in an exhaust gas passage and treating exhaust gas using plasma generated by the plasma generating electrode 1, uniform plasma can be stably generated due to a reduction in the amount of substance deposited on the surface of the unit electrode 2 forming the plasma generating electrode 1.

In the plasma generating electrode 1 according to one embodiment of the invention, at least one of the opposing unit electrodes 2 is the conductive-film-containing electrode 8 including the ceramic body 3 as a dielectric and the conductive film 4, as described above. The conductive-film-containing electrode 8 is a barrier discharge type electrode which can generate uniform plasma between the opposing unit electrodes 2. Therefore, the plasma generating electrode 1 according to one embodiment of the invention may be used for a plasma reactor which allows a gas containing a specific component to pass through the space between the unit electrodes 2 and to be reacted, such as an exhaust gas treatment device which treats exhaust gas or an ozonizer which produces ozone by reacting oxygen in air or the like. In particular, since the conductive film 4 is disposed inside the ceramic body 3, the conductive film 4 does not directly contact exhaust gas when using the plasma generating electrode 1 for an exhaust gas treatment device, whereby corrosion or deterioration of the conductive film 4 can be effectively prevented.

The plasma generating electrode 1 according to one embodiment of the invention is configured so that the distance “a” (mm) from the edge of the conductive film 4 to the edge of the ceramic body 3 on the other pair of ends 9 of the four ends of the conductive-film-containing electrode 8 adjacent to the pair of ends 15 and the thickness “c” (mm) of the ceramic body 3 satisfy the relationship “$(c/2)\leqq a\leqq 5c$”. If the distance “a” (mm) from the edge of the conductive film 4 to the edge of the ceramic body 3 on the other pair of ends 9 of the conductive-film-containing electrode 8 is less than “c/2” (mm), that is, if the distance “a” (mm) is less than half the thickness “c” (mm) of the ceramic body 3, the conductive-film-containing electrode 8 tends to break on the other pair of ends 9 due to thermal shock. When the conductive-film-containing electrode 8 is formed by stacking two ceramic sheets (ceramic green sheets) in a state in which the conductive film 4 is placed between the ceramic sheets, if the distance “a” (mm) is too short, the adhesion between the ceramic green sheets decreases on the other pair of ends 9, whereby the conductive-film-containing electrode 8 breaks on the other pair of ends 9. When causing a discharge to occur by applying voltage to such a conductive-film-containing electrode 8, a discharge occurs from the other pair of ends 9 toward the opposite electrode, whereby uniform plasma cannot be stably generated between the unit electrodes 2. This phenomenon occurs to a large extent when the opposite conductive-film-containing electrode 8 has also broken on the other pair of ends 9. If the distance “a” (mm) from the edge of the conductive film 4 to the edge of the ceramic body 3 is greater than “5c” (mm), that is, if the distance “a” (mm) is greater than five times the thickness “c” (mm) of the ceramic body 3, the ratio of the area in which a discharge occurs to the surface area of the conductive-film-containing electrode 8 is too low, whereby the plasma generation efficiency is decreased. Moreover, when using the plasma generating electrode 1 for an exhaust gas treatment device which treats a combustion exhaust gas or the like, since soot is deposited on the surface of the conductive-film-containing electrode 8 in an area corresponding to the other pair of ends 9, that is, in the area from the edge of the conductive film 4 to the edge of the ceramic body 3 in which plasma is not generated, the opening between the unit electrodes 2 is decreased, whereby the pressure loss of the exhaust gas treatment device is increased. If such a state continues for a long time, the opening between the unit electrodes 2 is completely closed by the deposited soot, whereby the exhaust gas passage cannot be secured.

In the conductive-film-containing electrode 8 forming the plasma generating electrode 1 according to one embodiment of the invention, it suffices that the distance “a” (mm) from the edge of the conductive film 4 to the edge of the ceramic body 3 and the thickness “c” (mm) of the ceramic body 3 satisfy the above-described relationship for at least one of the other pair of ends 9. It is preferable that the distance “a” and the thickness "c" satisfy the above-described relationship for both of the other pair of ends 9. When disposing the plasma generating electrode 1 according to one embodiment of the invention inside a gas passage, it is preferable that the distance "a" and the thickness "c" satisfy the above-described relationship for the end corresponding to the gas inlet side.

Figure 3:
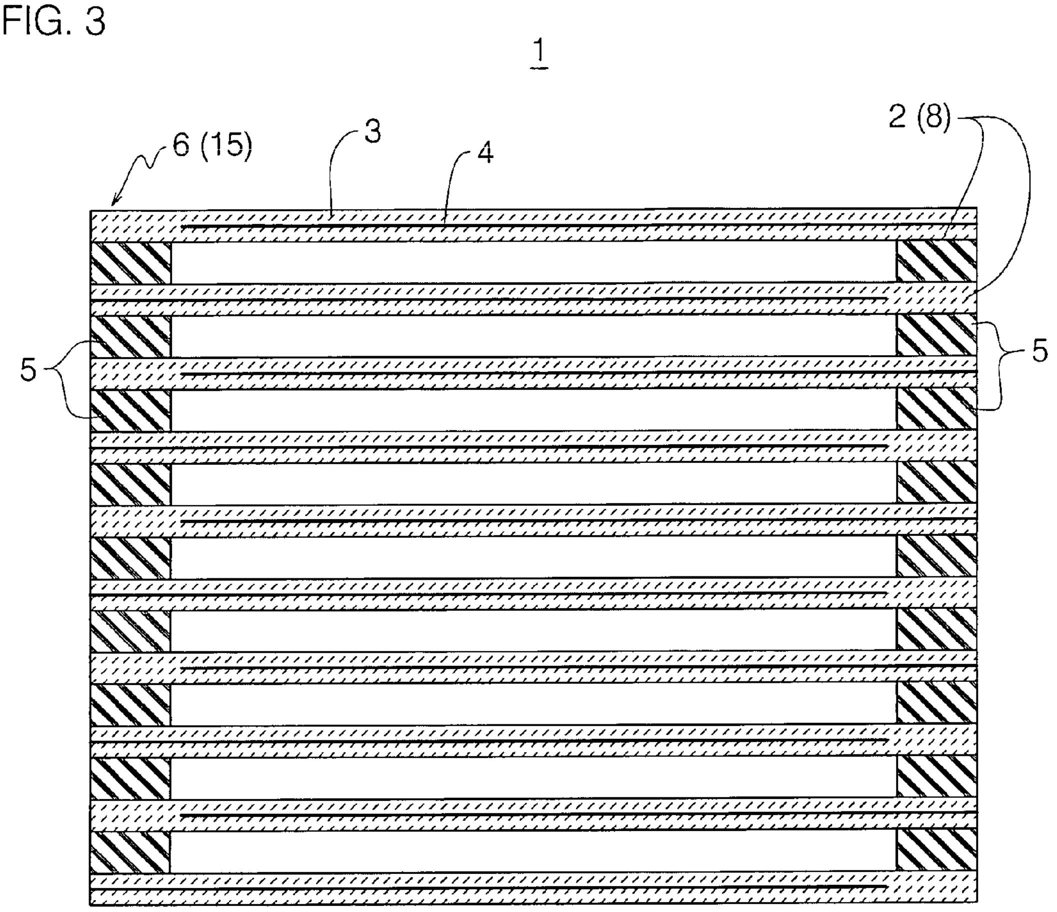
FIG. 3 is a cross-sectional view along a plane perpendicular to a unit electrode in another embodiment of the plasma generating electrode according to the invention.

The plasma generating electrode 1 shown in FIG. 1 has a configuration in which ten unit electrodes 2 are held by the holding members 5 alternately on opposite ends of the pair of ends. As shown in FIG. 3, the plasma generating electrode 1 may have a configuration in which the unit electrodes 2 are held on both of the pair of ends. In this case, the plasma generating electrode 1 is preferably configured so that voltage can be applied to the opposing unit electrodes 2 from the ends opposite to each other. In FIGS. 1 and 3, the plasma generating electrode 1 includes ten unit electrodes 2. Note that the number of unit electrodes 2 is not limited to ten.

Figure 4:
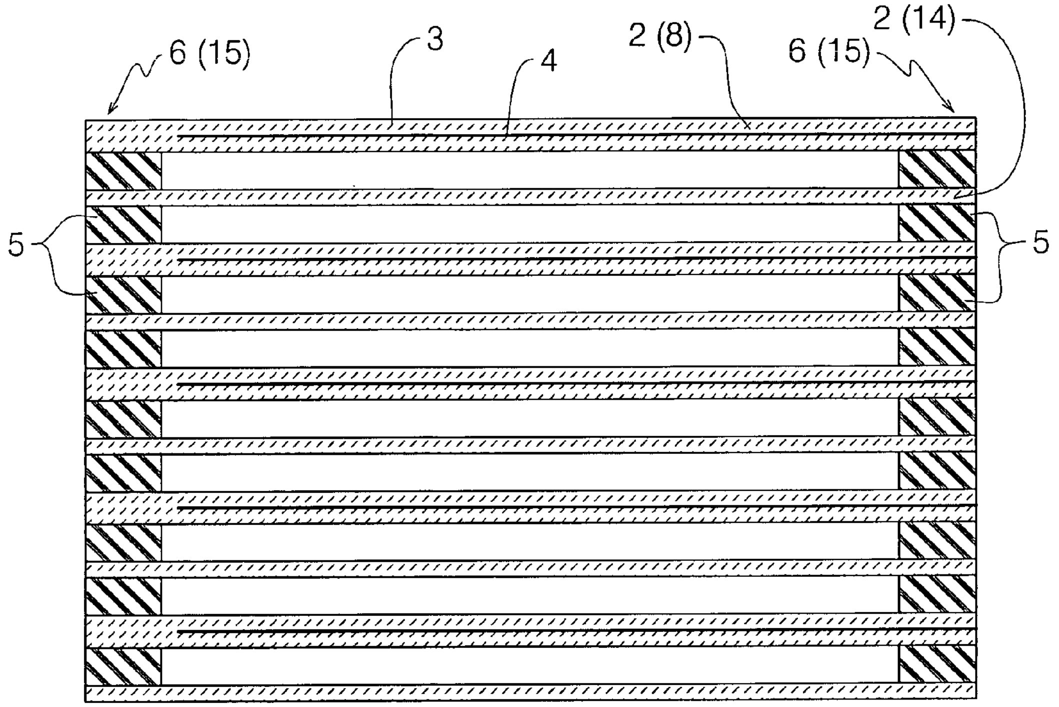
FIG. 4 is a cross-sectional view along a plane perpendicular to a unit electrode in still another embodiment of the plasma generating electrode according to the invention.

In the plasma generating electrode 1 shown in FIG. 1, each of the unit electrodes 2 is the conductive-film-containing electrode 8 including the ceramic body 3 as a dielectric and the conductive film 4 disposed inside the ceramic body 3. In one embodiment of the invention, it suffices that at least one of the opposing unit electrodes 2 be the conductive-film-containing electrode 8. As shown in FIG. 4, only one of the opposing unit electrodes 2 of the plasma generating electrode 1 may be the conductive-film-containing electrode 8, and the other unit electrode 14 may be a plate-shaped electrode exhibiting conductivity. In this case, the configuration of the other unit electrode 14 opposite to the conductive-film-containing electrode 8 is not particularly limited. For example, a known electrode such as a plate-shaped electrode formed of a conductive metal may be suitably used.

In the plasma generating electrode 1 according to one embodiment of the invention, it is preferable that a distance "b" (mm) from the edge of the conductive film 4 to the edge of the ceramic body 3 on the fixed end 6 of the conductive-film-containing electrode 8 and the thickness "c" (mm) of the ceramic body 3 satisfy the relationship "$2c \leqq b \leqq 10c$".

If the distance "b" (mm) from the edge of the conductive film 4 to the edge of the ceramic body 3 on the fixed end 6 is less than "2c" (mm), when the unit electrodes 2 are held on two or more ends and the holding members 5 overlap the conductive-film-containing electrodes 8, as shown in FIG. 3, a creeping discharge occurs from the fixed end 6 through the inside of the holding member 5, whereby nonuniform plasma may be generated between the unit electrodes 2. This phenomenon can be prevented by reducing the width of the holding member 5. In this case, a sufficient width for holding the conductive-film-containing electrode 8 may not be obtained. If the distance "b" (mm) from the edge of the conductive film 4 to the edge of the ceramic body 3 is greater than "10c" (mm), the ratio of the area in which a discharge occurs to the surface area of the conductive-film-containing electrode 8 is too low, whereby the plasma generation efficiency may be decreased.

In the plasma generating electrode 1 according to one embodiment of the invention, when the pair of ends 15 of the conductive-film-containing electrode 8 has an end (free end 7) other than the fixed end 6, as shown in FIG. 1, it is preferable that a distance "d" (mm) from the edge of the conductive film 4 to the edge of the ceramic body 3 on the free end 7 and the thickness "c" (mm) of the ceramic body 3 satisfy the relationship "$(c/2) \leqq d \leqq 5c$". When the pair of ends 15 has the free end 7, if the distance "d" (mm) from the edge of the conductive film 4 to the edge of the ceramic body 3 on the free end 7 is less than "c/2" (mm), the conductive-film-containing electrode 8 tends to break on the free end 7 due to thermal shock. When the conductive-film-containing electrode 8 is formed by stacking two ceramic sheets (ceramic green sheets) in a state in which the conductive film 4 is placed between the ceramic sheets, if the distance "d" (mm) is too short, the adhesion between the ceramic green sheets decreases on the free end 7, whereby the conductive-film-containing electrode 8 may break on the free end 7. When causing a discharge to occur by applying voltage to such a conductive-film-containing electrode 8, a discharge occurs from the free end 7 toward the opposite electrode, whereby uniform plasma cannot be stably generated between the unit electrodes 2. If the distance "d" (mm) from the edge of the conductive film 4 to the edge of the ceramic body 3 is greater than "5c", the ratio of the area in which a discharge occurs to the surface area of the conductive-film-containing electrode 8 is too low, whereby the plasma generation efficiency is decreased. Moreover, when using the plasma generating electrode 1 for an exhaust gas treatment device which treats a combustion exhaust gas or the like, since soot is deposited on the surface of the conductive-film-containing electrode 8 in an area corresponding to the free end 7, that is, in the area from the edge of the conductive film 4 to the edge of the ceramic body 3 in which plasma is not generated, the opening between the unit electrodes 2 is decreased, whereby the pressure loss of the exhaust gas treatment device may be increased.

In the plasma generating electrode 1 according to one embodiment of the invention, the thickness of the conductive film 4 forming the unit electrode 2 is not particularly limited. It is preferable that the thickness of the conductive film 4 be 5 to 30 μm taking the discharge efficiency and cost into consideration.

The material for the ceramic body 3 is not particularly limited insofar as the ceramic body 3 can be suitably used as a dielectric. It is preferable that the ceramic body 3 include at least one ceramic selected from the group consisting of alumina, mullite, ceramic glass, zirconia, cordierite, silicon nitride, aluminum nitride, and glass. A ceramic body 3 exhibiting excellent thermal shock resistance can be obtained by using such a ceramic.

In the plasma generating electrode 1 according to one embodiment of the invention, since a discharge is caused to occur using the conductive-film-containing electrode 8 in which the conductive film 4 is disposed inside the ceramic body 3 as a dielectric, a local discharge such as a spark discharge can be reduced and micro discharges can be caused to occur at a number of locations between the unit electrodes 2 in comparison with the case of causing a discharge to occur using only the conductive film 4. Since such micro discharges involve a small amount of current in comparison with a spark discharge or the like, power consumption can be reduced. Moreover, a discharge stops before the movement of ions occurs due to the presence of the dielectric so that the movement of electrons becomes dominant between the unit electrodes 2, whereby nonthermal plasma which does not cause an increase in temperature can be generated.

The porosity of the ceramic body 3 is preferably 0.1 to 10%, and still more preferably 0.1 to 3%. This configuration allows plasma to be efficiently generated between the opposing unit electrodes 2, whereby energy consumption can be reduced.

The conductive film 4 is not particularly limited insofar as plasma can be generated by applying voltage between the unit electrodes 2. It is preferable that the conductive film 4 include at least one metal selected from the group consisting of tungsten, molybdenum, manganese, chromium, titanium, zirconium, nickel, iron, silver, copper, platinum, and palladium. It is preferable that the conductive film 4 used in one embodiment of the invention include the above-mentioned metal in an amount of 60 wt % or more of the total amount of the components of the conductive film 4. When the conductive film 4 includes two or more metals selected from the above-mentioned group, it is preferable that the total amount of the metals be 60 wt % or more of the total amount of the components of the conductive film 4.

It suffices that the holding member 5 hold the fixed end 6 of the unit electrode 2 in a state in which the unit electrodes 2 are separated at a specific interval. For example, a ceramic formed in the shape of a prism may be used. In more detail, it is preferable that the holding member 5 include at least one compound selected from the group consisting of alumina, silicon nitride, SIALON, cordierite, mullite, zirconia, spinel, aluminum nitride, silica, glass, crystallized glass, boron nitride, and an aluminum nitride-boron nitride composite material. It is preferable that the holding member 5 exhibit electrical insulating properties in order to prevent a local creeping discharge, and have a low coefficient of thermal expansion in order to prevent breakage due to thermal stress.

The interval between the unit electrodes 2 is appropriately selected depending on a desired plasma intensity, a power supply which applies voltage, and the like. When using the plasma generating electrode 1 for treating $NO_x$ in exhaust gas, it is preferable to set the interval between the unit electrodes 2 at 0.5 to 2 mm, for example.

The ceramic body 3 forming the conductive-film-containing electrode 8 may be formed using a tape-shaped ceramic green sheet. When using a ceramic green sheet, it is preferable to apply the conductive film 4 to the ceramic green sheet. As preferable examples of a specific application method, screen printing, calender rolling, spraying, electrostatic painting, dip coating, knife coating, chemical vapor deposition, physical vapor deposition, and the like can be given. According to these methods, a thin conductive film 4 exhibiting excellent surface flatness after application can be easily formed.

A method of manufacturing the plasma generating electrode 1 according to one embodiment of the invention is described below in detail.

First, slurry (ceramic green sheet slurry) for forming a tape-shaped ceramic green sheet which forms the ceramic body forming the plasma generating electrode is prepared. The slurry is prepared by mixing ceramic powder with an appropriate binder, sintering agent, plasticizer, dispersant, organic solvent, and the like. As the ceramic powder, powder of alumina, mullite, cordierite, silicon nitride, aluminum nitride, or the like may be suitably used. The sintering agent is preferably added in an amount of 3 to 10 parts by weight for 100 parts by weight of the ceramic powder. As the plasticizer, dispersant, and organic solvent, a plasticizer, dispersant, and organic solvent used for a known slurry used to form a ceramic green sheet may be suitably used. The ceramic green sheet slurry may be in the form of paste.

As the ceramic body used in one embodiment of the invention, a ceramic sheet formed by extrusion may also be suitably used. For example, a sheet-shaped ceramic formed body obtained by preparing a mixture by adding a forming agent such as methyl cellulose, a surfactant, and the like to the above-mentioned ceramic powder and extruding the mixture through a specific die may be used.

The resulting ceramic green sheet slurry is formed to a specific thickness by a known method such as a doctor blade method, a calender method, a printing method, or a reverse roll coating method to form a ceramic green sheet. The resulting ceramic green sheet may be subjected to cutting, shaving, punching, or communication opening formation, or may be used as an integral laminate in which the ceramic green sheets are stacked and bonded by thermocompression bonding or the like.

A conductive paste for forming the conductive film is separately prepared. The conductive paste may be prepared by adding a binder and a solvent such as terpineol to molybdenum powder and sufficiently kneading the mixture using a triple roll mill, for example. An additive may be arbitrarily added to the conductive paste in order to improve the adhesion to the ceramic green sheet and to improve the sintering properties.

The adhesion between the conductive film and the ceramic body can be improved by adding the component of the ceramic body to the metal component of the conductive film. A glass component may be added to the ceramic component added to the metal component. The addition of the glass component improves the sintering properties of the conductive film, whereby the density of the conductive film is improved in addition to adhesion. The total amount of the component of the ceramic body and/or the glass component other than the metal component is preferably 30 wt % or less. If the total amount exceeds 30 wt %, the function of the conductive film may not obtained due to a decrease in resistance.

The resulting conductive paste is printed on the surface of the ceramic green sheet by screen printing or the like to form a conductive film having a specific shape. In one embodiment of the invention in which the ceramic body is formed by stacking two ceramic green sheets, the conductive paste is printed so that the distance "a" (mm) from the edge of the conductive film to the edge of the ceramic body on a pair of parallel ends (other pair of ends) of the four ends of the conductive-film-containing electrode adjacent to a pair of ends including the fixed end when assembling the plasma generating electrode using the conductive-film-containing electrode and the thickness "c" (mm) of the ceramic body (thickness of two ceramic green sheets) satisfy the relationship "$(c/2) \leqq a \leqq 5c$". It is preferable that the conductive paste be printed so that the distance "b" (mm) from the edge of the conductive film to the edge of the ceramic body on the fixed end of the unit electrode and the thickness "c" (mm) of the ceramic body satisfy the relationship "$2c \leqq b \leqq 10c$". When the pair of ends of the conductive-film-containing electrode has an end (free end) other than the fixed end, it is preferable that the conductive paste be printed so that the distance "d" (mm) from the edge of the conductive film to the edge of the ceramic body on the free end and the thickness "c" (mm) of the ceramic body satisfy the relationship "$(c/2) \leqq d \leqq 5c$".

The ceramic green sheet on which the conductive film is printed and another ceramic green sheet are stacked so that the printed conductive film is covered to obtain a ceramic green sheet in which the conductive film is disposed. It is preferable to stack the ceramic green sheets at a temperature of 100° C. while applying a pressure of 10 MPa.

The ceramic green sheet in which the conductive film is disposed is fired to form a unit electrode (conductive-film-containing electrode). A necessary number of conductive-film-containing electrodes are formed by this method.

A holding member for holding the fixed end of the unit electrode is separately formed. The holding member used for the plasma generating electrode according to one embodiment of the invention may be formed by press forming a mixed powder of an alumina raw material powder and an organic binder, subjecting the resulting product to binder prefiring and firing, and arbitrarily performing final dimensional finishing by grinding. Note that the formation method for the holding member is not limited to the above-described method.

The unit electrodes are held by the resulting holding member at a specific interval. In this case, both of the opposing unit electrodes may be conductive-film-containing electrodes, or only one of the opposing unit electrodes may be a conductive-film-containing electrode. When only one of the opposing unit electrodes is a conductive-film-containing electrode, a known electrode such as a metal plate as the other electrode and the conductive-film-containing electrode are alternately held by the holding member. The plasma generating electrode according to one embodiment of the invention can be manufactured in this manner. Note that the manufacturing method for the plasma generating electrode according to one embodiment of the invention is not limited to the above-described method.

Figure 5A:
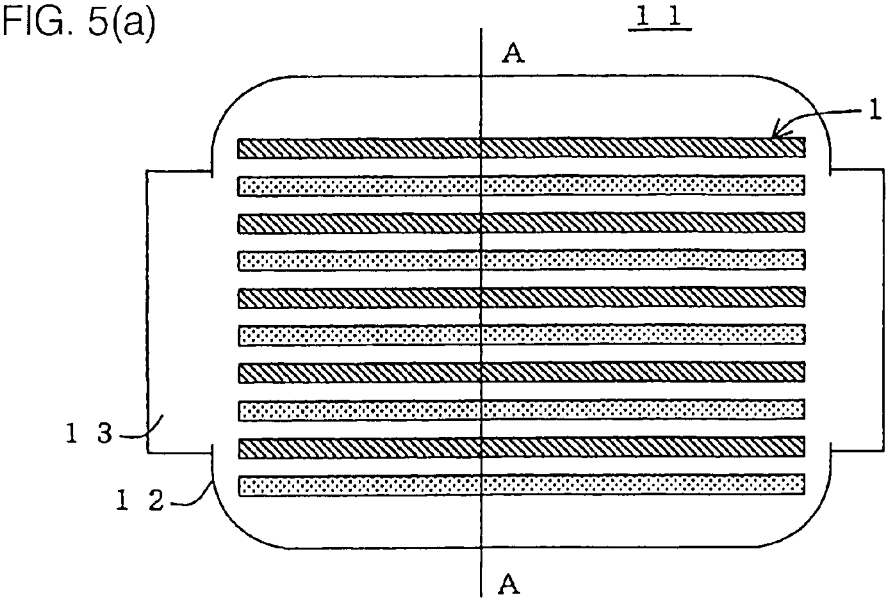
FIG. 5(*a*) is a cross-sectional view showing one embodiment of a plasma reactor according to the invention along a plane including a gas flow direction.
Figure 5B:
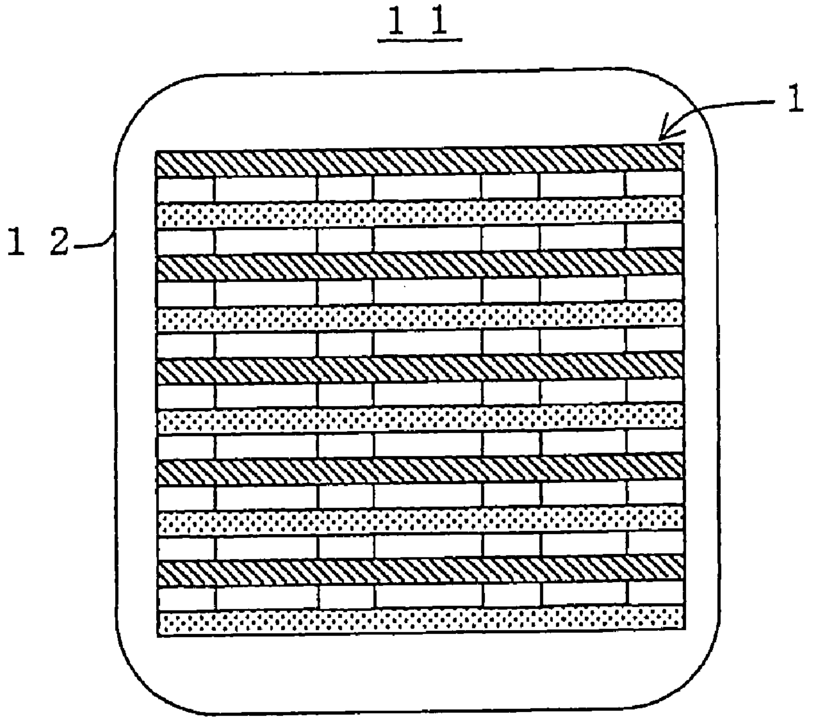

One embodiment of the plasma reactor according to the invention is described below. FIG. 5(*a*) is a cross-sectional view showing one embodiment of the plasma reactor according to the invention along a plane including a gas flow direction, and FIG. 5(*b*) is a cross-sectional view along the line A-A shown in FIG. 5(*a*).

As shown in FIGS. 5(*a*) and 5(*b*), a plasma reactor 11 according to one embodiment of the invention includes one embodiment (plasma generating electrode 1) of the plasma generating electrode according to the invention as shown in FIG. 1, and a casing 12 having a passage (gas passage 13) for a gas containing a specific component formed therein, in which, when the gas is introduced into the gas passage 13 of the casing 12, the specific component contained in the gas can be reacted using plasma generated by the plasma generating electrode 1. The plasma reactor 11 according to one embodiment of the invention may be suitably used as an exhaust gas treatment device or an ozonizer which produces ozone by reacting oxygen in air, for example. Since the plasma reactor 11 according to one embodiment of the invention includes one embodiment (plasma generating electrode 1) of the plasma generating electrode according to the invention, breakage of each end of the unit electrode due to thermal stress or deposition of soot on the surface of the unit electrode when used as a treatment device for exhaust gas containing soot or the like can be effectively prevented.

The material for the casing 12 forming the plasma reactor 11 according to one embodiment of the invention is not particularly limited. For example, it is preferable that the material for the casing 12 be ferritic stainless steel having excellent conductivity, being lightweight and inexpensive, and showing only a small amount of deformation due to thermal expansion.

The plasma reactor according to one embodiment of the invention may further include a power supply (not shown) for applying voltage to the plasma generating electrode. As the power supply, a known power supply may be used insofar as it can supply current which can cause plasma to be effectively generated. It is preferable that the power supply be a pulsed power supply. It is still more preferable that the power supply include at least one SI thyristor. Plasma can be more efficiently generated by using such a power supply.

The plasma reactor according to one embodiment of the invention may be configured so that current is supplied from an external power supply instead of providing a power supply in the plasma reactor.

Current supplied to the plasma generating electrode forming the plasma reactor may be appropriately selected depending on the intensity of plasma to be generated. When installing the plasma reactor in an automotive exhaust system, it is preferable that current supplied to the plasma generating electrode be a direct current at a voltage of 1 kV or more, a pulsed current having a peak voltage of 1 kV or more and a pulse rate per second of 100 or more (100 Hz or more), an alternating current having a peak voltage of 1 kV or more and a frequency of 100 or more (100 Hz or more), or a current generated by superimposing two of these currents. This configuration enables plasma to be efficiently generated.

EXAMPLES

The invention is described below in more detail by way of examples. Note that the invention is not limited to the following examples.

Example 1

A plasma generating electrode including two or more opposing plate-shaped unit electrodes and a holding member holding one end (fixed end) of the unit electrode in a state in which the unit electrodes were separated at a specific interval was manufactured. The unit electrode forming the plasma generating electrode was made up of a ceramic body as a dielectric and a conductive film disposed inside the ceramic body.

The ceramic body forming the unit electrode was formed using a ceramic green sheet. In Example 1, the surface of the ceramic body was in the shape of a rectangle with a length of 90 mm and a width of 50 mm, and the ceramic body had a thickness of 1 mm. The conductive film was formed by printing a paste containing tungsten approximately at the center of the ceramic body. The conductive film had a length of 80 mm, a width of 48 mm, and a thickness of 10 μm. In the plasma generating electrode of Example 1, the distance from the edge of the conductive film to the edge of the ceramic body on a pair of parallel ends (pair of ends) including the end (fixed end) held by the holding member was 1 mm (length the same as the thickness of the ceramic body), and the distance from the edge of the conductive film to the edge of the ceramic body on the other pair of parallel ends (other pair of ends) adjacent to the above pair of ends was 5 mm (length five times the thickness of the ceramic body).

A treatment test of exhaust gas containing soot was conducted using the plasma generating electrode of Example 1. Adhesion of soot contained in the exhaust gas to the other pair of ends of the unit electrode was not observed. After continuously performing the test for 30 hours, the plasma generating electrode was disassembled, and the surface of the unit electrode was observed. As a result, significant adhesion of soot was not observed.

Comparative Example 1

A plasma generating electrode was manufactured in the same manner as in Example 1 except for changing the width of the conductive film to 49.5 mm. In the plasma generating electrode of Comparative Example 1, the distance from the edge of the conductive film to the edge of the ceramic body on the other pair of ends adjacent to a pair of ends including the free end was 0.25 mm (length one-quarter the thickness of the ceramic body).

When printing a conductive film paste on the inner surfaces of two ceramic green sheets forming the ceramic body and firing the conductive film together with the ceramic green sheets, cracks occurred between the ceramic green sheets. A discharge was caused to occur using the resulting conductive-film-containing electrode (unit electrode). As a result, a nonuniform discharge occurred from the cracks toward the opposite unit electrode, whereby a uniform discharge could not be caused to occur between the unit electrodes.

Comparative Example 2

A plasma generating electrode was manufactured in the same manner as in Example 1 except for changing the width of the conductive film to 35 mm. In the plasma generating electrode of Comparative Example 2, the distance from the edge of the conductive film to the edge of the ceramic body on the other pair of ends adjacent to a pair of ends including the free end was 7.5 mm (length 7.5 times the thickness of the ceramic body).

After performing the exhaust gas treatment test in the same manner as in Example 1, the plasma generating electrode was disassembled and the surface of the unit electrode was observed. As a result, significant adhesion of soot was observed on the end of the unit electrode corresponding to the exhaust gas inlet.

INDUSTRIAL APPLICABILITY

The plasma generating electrode according to the invention is effectively prevented from breaking due to thermal shock and, when disposing the plasma generating electrode in an exhaust gas passage and treating exhaust gas using plasma generated by the plasma generating electrode, capable of stably generating uniform plasma due to a reduction in the amount of substance deposited on the surface of a unit electrode forming the plasma generating electrode. Since the plasma reactor according to the invention includes the plasma generating electrode according to the invention, the plasma reactor can generate uniform and stable plasma and exhibits excellent heat resistance. Therefore, the plasma reactor can be used for various types of gas.

The invention claimed is:

1. A plasma generating electrode comprising at least two opposing plate-shaped unit electrodes, each having a rectangular surface and four end faces, and a holding member which holds at least one fixed end of a pair of parallel end faces of the unit electrode in a state in which the unit electrodes are separated at a specific interval, and is capable of generating plasma upon application of voltage between the unit electrodes, a majority of the unit electrodes being held sandwiched by a pair of the holding members, respectively, at the at least one end face, where outer most edges of both the holding members and an outer most edge of the unit electrode together form a substantially planar outer edge of the plasma generating electrode, at least one of the opposing unit electrodes being a conductive-film-containing electrode including a ceramic body as a dielectric and a conductive film disposed inside the ceramic body, and a distance “a” from an edge of the conductive film to an edge of the ceramic body on a second pair of parallel end faces of the conductive-film-containing electrode adjacent to the first pair of parallel end faces and a thickness “c” of the ceramic body satisfying a relationship “$(c/2) \leqq a \leqq 5c$”.

2. The plasma generating electrode according to claim 1, wherein a distance “b” (mm) from the edge of the conductive film to the edge of the ceramic body on the fixed end of the conductive-film-containing electrode and the thickness “c” of the ceramic body satisfy a relationship “$2c \leqq b \leqq 10c$”.

3. The plasma generating electrode according to claim 1, wherein, when the first pair of parallel end faces of the conductive-film-containing electrode has a free end opposite to the fixed end, a distance “d” from the edge of the conductive film to the edge of the ceramic body on the free end and the thickness “c” of the ceramic body satisfy a relationship “$(c/2) \leqq d \leqq 5c$”.

4. The plasma generating electrode according to claim 1, wherein the conductive film has a thickness of 5 to 30 μm.

5. The plasma generating electrode according to claim 1, wherein the ceramic body includes at least one ceramic selected from the group consisting of alumina, mullite, ceramic glass, zirconia, cordierite, silicon nitride, aluminum nitride, and glass.

6. The plasma generating electrode according to claim 1, wherein the conductive film includes at least one metal selected from the group consisting of tungsten, molybdenum, manganese, chromium, titanium, zirconium, nickel, iron, silver, copper, platinum, and palladium.

7. A plasma reactor comprising:

the plasma generating electrode according to claim 1; and a casing having a gas passage, wherein, when a gas is introduced into the gas passage of the casing, a specific component contained in the gas can be reacted using plasma generated by the plasma generating electrode.

8. The plasma reactor according to claim 7, further comprising a pulsed power supply for applying voltage to the plasma generating electrode.

9. The plasma reactor according to claim 8, wherein the pulsed power supply includes at least one SI thyristor.

10. The plasma generating electrode according to claim 1, wherein the ceramic body is a dense ceramic and the ceramic body and the conductive film are integrated.

* * * * *